US008913069B2

(12) United States Patent
Mani et al.

(10) Patent No.: US 8,913,069 B2
(45) Date of Patent: Dec. 16, 2014

(54) MAGNETIC MEMORY DISPLAY DRIVER SYSTEM

(75) Inventors: Krishnakumar Mani, San Jose, CA (US); Jay Kamdar, Cupertino, CA (US)

(73) Assignee: III Holdings 1, LLC, Wilmington, DE (US)

(*) Notice: Subject to any disclaimer, the term of this patent is extended or adjusted under 35 U.S.C. 154(b) by 206 days.

(21) Appl. No.: 12/706,694

(22) Filed: Feb. 16, 2010

(65) Prior Publication Data

US 2010/0207952 A1 Aug. 19, 2010

Related U.S. Application Data

(60) Provisional application No. 61/152,928, filed on Feb. 16, 2009.

(51) Int. Cl.

| | |
|---|---|
| ***G06T 1/60*** | (2006.01) |
| ***G06F 13/14*** | (2006.01) |
| ***G09G 5/39*** | (2006.01) |
| ***G09G 5/00*** | (2006.01) |

(52) U.S. Cl.

CPC .......... *G09G 5/00* (2013.01); *G09G 2300/0857* (2013.01)

USPC ............................ 345/530; 345/519; 345/531

(58) Field of Classification Search

CPC ......... G06F 3/046; G09G 3/2092; G09G 5/39

USPC .......................................... 345/531, 519, 530

See application file for complete search history.

(56) References Cited

U.S. PATENT DOCUMENTS

| | | | | |
|---|---|---|---|---|
| 6,754,124 | B2 * | 6/2004 | Seyyedy et al. | 365/214 |
| 6,756,970 | B2 * | 6/2004 | Keely et al. | 345/173 |
| 6,760,016 | B2 * | 7/2004 | Sharma | 345/173 |
| 6,930,910 | B2 * | 8/2005 | Oh et al. | 365/158 |
| 7,010,438 | B2 * | 3/2006 | Hancock et al. | 702/60 |
| 7,027,056 | B2 * | 4/2006 | Koselj et al. | 345/519 |
| 7,098,493 | B2 * | 8/2006 | Van Der Zaag et al. | 257/295 |
| 7,405,958 | B2 * | 7/2008 | Okazawa | 365/66 |
| 8,018,447 | B2 * | 9/2011 | Miyata et al. | 345/204 |

* cited by examiner

*Primary Examiner* — Joni Richer

(74) *Attorney, Agent, or Firm* — McAndrews, Held & Malloy, Ltd.

(57) ABSTRACT

In one embodiment there is provided, a display driver system, comprising, at least one display driver; a magnetic random access memory (MRAM) macro; and a display driver interface coupling the MRAM macro and the at least one display driver.

6 Claims, 2 Drawing Sheets

MAGNETIC MEMORY DISPLAY DRIVER SYSTEM

This application claims the benefit of priority to U.S. Provisional Patent Application No. 61/152,928 filed Feb. 16, 2009.

FIELD

Embodiments of the invention relate display drivers and to systems that include display drivers.

BACKGROUND

The displays used in many human interface devices come in various formats such as computer display (VGA, SVGA etc.), cell phones, PDA, Mini LCD displays, Digital cinema, Video conferencing format, Digital Television format and more. Existing forms of display memory buffers are implemented with memory technologies such as SRAM (Static Random Access Memory), 1-TSRAM (1-Transistor Static Random Access Memory). These memory technologies suffer from the disadvantages of huge static power consumption and require periodic memory refresh. The display driver chip with integrated buffer memory needs to fit certain physical form factors dictated by the display dimensions. As the demand for higher resolution increases over every display generation the buffer memory requirement also increases steadily. Moreover, it is becoming increasingly difficult to scale the SRAM and 1T-SRAM to fit the physical dimensions allowed.

SUMMARY

In one embodiment, there is provided a display driver system that includes an MRAM storage and a method of making MRAM for display driver applications that involves the integration of MRAM core and the current drivers to drive the display matrix in a single semiconductor device.

In one embodiment, the invention discloses the application of Magnetic Random Access Memory (MRAM) to implement display drivers. MRAMs may be implemented using Field Induced Switching, Spin Torque Transfer, Thermally Assisted Switching and others. The method comprises of implementing the buffer memory using MRAM in which the processor stores and retrieves data corresponding to the display pixel information.

In another embodiment, the invention discloses a MRAM memory device architecture that implements the buffer memory of the display driver. The memory device may comprise an array of bits, each to store data and having a memory address; a read circuit for reading data from selected bits in the array based on a memory address of the selected bits; and a write circuit for writing data to the array given write data and a memory address in the array at which to write the write data.

In another embodiment the invention discloses an MRAM memory device that implements MRAM memory and the drivers for driving the display.

Other aspects of the invention will be apparent from the detailed description below:

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Magnetic random access memory (MRAM) devices are capable of storing data without consuming static power. Further, MRAM devices do not require data refresh and enjoy a smaller size footprint when compared to other memory device. Advantageously, embodiments of the present invention disclose a display driver system that incorporates MRAM technology. Embodiments of the present invention also disclose an electronic device that incorporates the display driver system.

Figure 1:
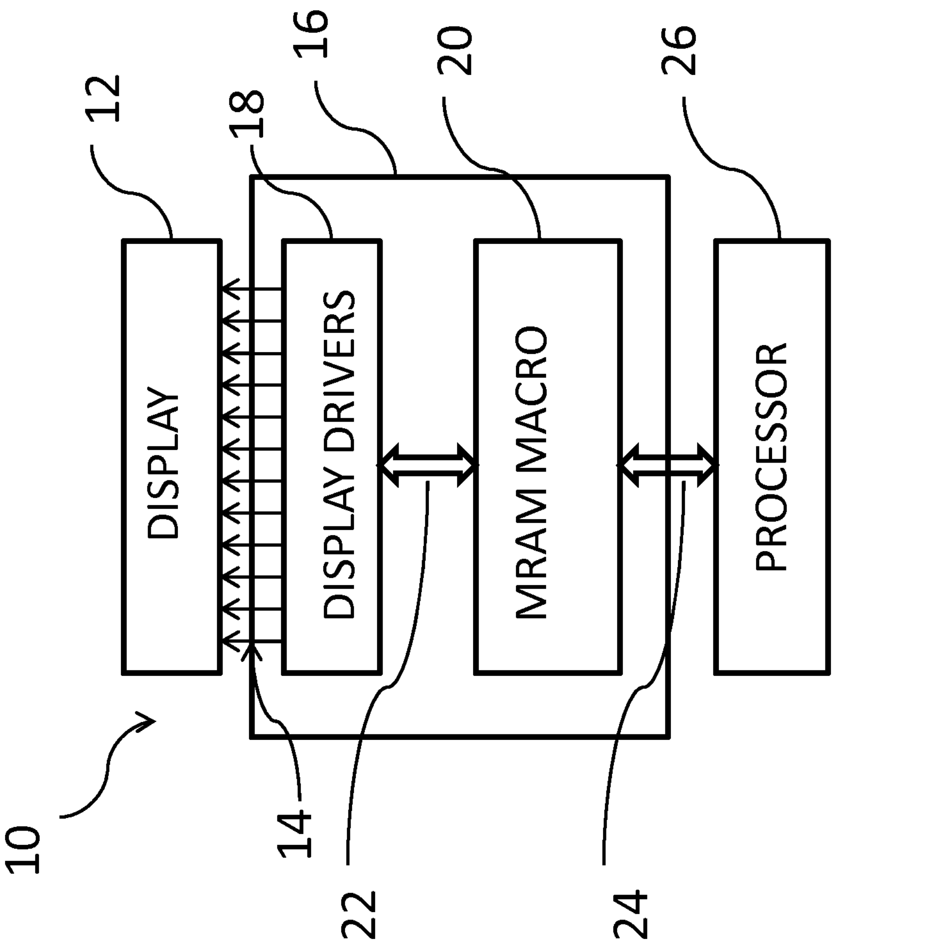
FIG. 1 shows a block diagram of a display driver system in accordance with one embodiment of the invention.

Referring to FIG. 1 of the drawings there is shown an electronic device 10 in accordance with one embodiment of the invention. The electronic device may represent any electronic device. Examples include a mobile phone and a television. As will be seen, the electronic device 10 includes a display 12. The display 12 is coupled to a display driver system 16 via connections 14. The display driver system 16 is coupled to a processor 26 via an input/output (I/O) bus 24. The display driver system 16 includes display drivers 18 coupled to an MRAM macro 20 via a display driver interface 22.

In accordance with one embodiment, the MRAM Macro comprises an array of randomly addressable MRAM cells with necessary addressing, writing and sensing circuitry, as will be understood by one of ordinary skill in the art. The MRAM cells may be written and read using induced magnetic field (Field Induced Magnetic Switching), Spin Torque Transfer, Thermally Assisted Switching or any other magnetic switching methods. The MRAM macro 20 communicates with the processor 26 through the I/O bus 24. The processor 26 stores data in and retrieves data from the MRAM macro 20.

Figure 2:
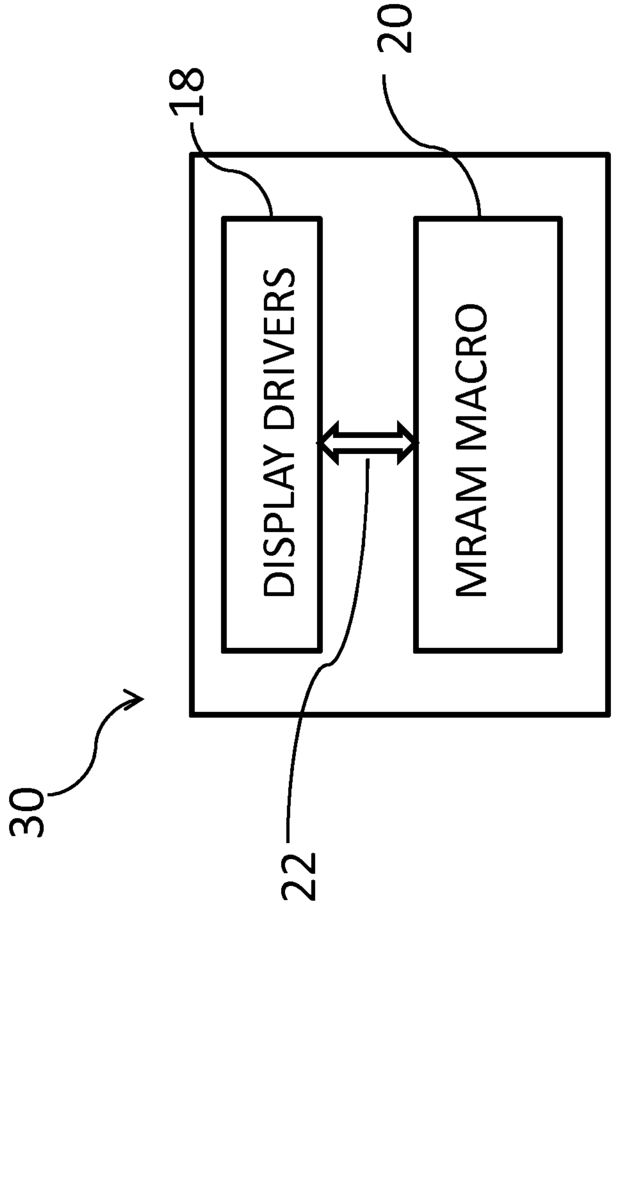
FIG. 2 shows a representative implementation of a display driver system on a single semiconductor chip, in accordance with one embodiment of the invention.

FIG. 2 shows a representative implementation of the MRAM macro 20 and the display drivers 18 on a single semiconductor chip 30.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A display driver system, comprising:

at least one display driver;

a magnetic random access memory (MRAM) macro comprising an array of randomly addressable MRAM cells, addressing circuitry, writing circuitry, and sensing circuitry; and a display driver interface coupling the MRAM macro and the at least one display driver;

wherein the display driver and the MRAM macro are integrated on a single semiconductor chip, said chip being connectable to a display and to a processor.

2. An electronic device, comprising:

a display;

a processor; and a display driver system to drive the display, wherein the display driver system comprises a magnetic random access memory (MRAM) macro comprising an array of randomly addressable MRAM cells, addressing circuitry, writing circuitry, and sensing circuitry; the display driver system and the MRAM macro being integrated on a single semiconductor chip, which is connected to the display and the processor.

3. The electronic device of claim 2, wherein the display driver system further comprises at least one display driver.

4. The electronic device of claim 2, wherein the display driver system further comprises a display driver interface to couple the at least one display driver with the MRAM macro.

5. The electronic device of claim 4, wherein the electronic device is a mobile phone.

6. The electronic device of claim 4, wherein the electronic device is a television.

* * * * *